(12) United States Patent
Tanner et al.

(10) Patent No.: US 12,448,884 B2
(45) Date of Patent: Oct. 21, 2025

(54) ANALYSING STRUCTURES WITHIN A BOREHOLE

(71) Applicant: Cereus Ultrasonics Limited, Aberdeen (GB)

(72) Inventors: Mark Tanner, Wimborne (GB); Paul Easton, Portland (GB); Max Hadley, Lyndhurst (GB)

(73) Assignee: Cereus Ultrasonics Limited, Aberdeen (GB)

( * ) Notice: Subject to any disclaimer, the term of this patent is extended or adjusted under 35 U.S.C. 154(b) by 0 days.

(21) Appl. No.: 18/547,310

(22) PCT Filed: Feb. 21, 2022

(86) PCT No.: PCT/GB2022/050472
§ 371 (c)(1),
(2) Date: Aug. 21, 2023

(87) PCT Pub. No.: WO2022/175690
PCT Pub. Date: Aug. 25, 2022

(65) Prior Publication Data
US 2024/0125231 A1   Apr. 18, 2024

(30) Foreign Application Priority Data
Feb. 22, 2021 (GB) .................................. 2102493

(51) Int. Cl.
*E21B 47/14* (2006.01)
*E21B 47/095* (2012.01)

(52) U.S. Cl.
CPC ............ *E21B 47/14* (2013.01); *E21B 47/095* (2020.05)

(58) Field of Classification Search
CPC ........ E21B 47/00; E21B 47/08; E21B 47/085; E21B 47/09; E21B 47/095; E21B 47/10; E21B 47/107; E21B 47/12; E21B 47/14
See application file for complete search history.

(56) References Cited

U.S. PATENT DOCUMENTS 4,685,092 A   8/1987 Dumont
10,379,246 B2 *  8/2019 Lie ........................... G01V 1/44
(Continued)

FOREIGN PATENT DOCUMENTS

WO   2017146674 A1   8/2017

OTHER PUBLICATIONS

International Search Report and Written Opinion from corresponding PCT Application No. PCT/GB2022/050472 dated May 13, 2022.
(Continued)

*Primary Examiner* — Franklin D Balseca
(74) *Attorney, Agent, or Firm* — Scale LLP

(57) ABSTRACT

A device and method for analyzing structures within a borehole is disclosed. The device comprises: a medium determiner for determining a medium surrounding the device; at least one acoustic signal transmitter and acoustic signal receiver configured to output an acoustic signal and to receive an acoustic signal; and a signal modifier configured to modify at least one of a phase and amplitude of the acoustic signal at at least one of the acoustic signal transmitter and acoustic signal receiver. The signal modifier is configured to receive a medium indicator signal from the medium determiner indicative of the medium surrounding the device and to apply a signal modification to at least one of the at least one acoustic signal transmitter and acoustic signal receiver in dependence upon the medium indicator signal.

15 Claims, 4 Drawing Sheets

(56) References Cited

U.S. PATENT DOCUMENTS

2009/0222209 A1    9/2009  Morys
2016/0033663 A1*   2/2016  Lu .......................... G01V 1/40
                                                        367/25

OTHER PUBLICATIONS

Written Opinion of International Preliminary Examining Authority from corresponding PCT Application No. PCT/GB2022/050472 dated Jan. 1, 2023.
Third Party Observations submitted in corresponding EP App. No. 22707818.5.

* cited by examiner

ANALYSING STRUCTURES WITHIN A BOREHOLE

CROSS-REFERENCE TO RELATED APPLICATION(S)

This application is a National Stage under 35 U.S.C. § 371 of International Application No. PCT/GB2022/050472, filed Feb. 21, 2022, which claims priority to United Kingdom Patent Application No. 2102493.0, filed on Feb. 22, 2021, entitled "Analysing Structures Within a Borehole," the contents of all of which are incorporated by reference in its entirety.

TECHNICAL FIELD

The field of the disclosure relates to analysing structures within a borehole.

BACKGROUND

It is desirable to be able to analyse remote targets such as structures within a borehole. Acoustic analysis techniques exist where transducers are used to transmit and receive an acoustic signal, changes between the transmitted and received acoustic signals being indicative of the medium through which they are transmitted and any structures within the medium.

However, problems associated with such analysis techniques include distortions of the transmitted and received signals at the transmitter, receiver and in the transmission medium which degrade the signal and render analysis of the changes occurring in it due to the structure difficult.

Techniques are known which seek to reduce distortion at the transmitter and receiver both by the use of hardware and software techniques which seek to filter out the distortions caused by the transducers themselves.

Analysis in environments such as a borehole where the environment surrounding the structure of interest or target changes can be particularly challenging.

Embodiments seek to provide improved techniques to analyse structures within media of changing nature or composition.

SUMMARY OF THE DISCLOSURE

A first aspect provides a device for analysing structures within a borehole. The device may include: a medium determiner for determining a medium surrounding said device; at least one acoustic signal transmitter and acoustic signal receiver configured to output an acoustic signal and to receive an acoustic signal; a signal modifier configured to modify at least one of a phase and amplitude of said acoustic signal at said at least one acoustic signal transmitter; wherein said signal modifier is configured to receive a medium indicator signal from said medium determiner indicative of said medium surrounding said device and to apply a signal modification to said at least one acoustic signal transmitter in dependence upon said medium indicator signal.

The inventors recognised that when analysing a structure, a signal will be distorted not only by the transmitter and receiver but also by the environment or channel through which the signal travels between the transmitter, receiver and target structures. A signal modifier is provided that applies distortions of one or more of phase and amplitude to the transmitted signals in order to equalise, reduce or filter out at least some of the distortions caused by the transmitter, receiver and channel. As the channel changes along the length of the borehole as the medium or fluid surrounding the device and structure change so too do the distortions generated by this medium. The device therefore comprises a medium determiner that determines the medium in which the device is currently immersed and applies a compensating signal modification appropriate to that medium. In this way as a device travels through a borehole and the environment around the device changes, this can be compensated for and effective and accurate analysis of the structure within the borehole achieved.

In some embodiments, said signal modifier is configured in response to said medium indicator signal indicating a change in medium surrounding said device, to apply a different signal modification to at least one of said phase and amplitude of said at least one transmitted and optionally said at least one received acoustic signal.

As the signal modifier modifies the signals to compensate for distortions that occur to the signal both within the transmitter, the receiver and the channel through which the signal is transmitted, changes in the medium surrounding the device lead to changes in the degradation of the signal through the channel and thus, in order to maintain the accuracy of the signal received it is advantageous if in response to detecting changes in the medium appropriate changes in the signal modification are made. In this regard, the medium determiner may be operated periodically or at particular points or depths in the borehole and/or it may be operated in response to a request either from the user or from control circuitry associated with the device which detects a change in the maximum level or other characteristic of the signal.

In some embodiments, said signal modifier is configured to modify both an amplitude and a phase of said acoustic signal.

Although the signal modifier may improve the signal by modifying just one of the amplitude or the phase, improved compensation may be achieved if both amplitude and phase are modified.

Similarly, although the signal modifier may be configured to modify the acoustic signal at just the acoustic transmitter, in some embodiments it may be configured to modify the acoustic signal at both the transmitter and receiver. An approved effect may be achieved by modifying at both although modifications at one may be acceptable in some cases.

Although the acoustic signal transmitter and acoustic signal receiver may be separate devices in some cases transducers, in some embodiments they are a single device.

Transducers may be used as both transmitters and receivers, where the signal detected is a reflected signal then it may be appropriate to use a single device. In some cases the signal may be received at a different location and in this case two separate devices are required.

In some embodiments, said medium determiner is configured to determine said medium by determining the speed of an acoustic signal transmitted through said medium.

Although the medium determiner may be a number of things, for example it may be a device for measuring density, one simple yet effective way of determining the medium or fluid surrounding the device is to determine the speed of an acoustic signal transmitted through the medium. Different medium transmit acoustic waves at different speeds depending on their viscosity for example. Thus, the speed of transmission of the acoustic signal is a good indicator of the properties of the medium.

In some embodiments, said medium determiner comprises an acoustic signal transmitter and receiver and an acoustic signal reflector for reflecting an acoustic signal output by said acoustic signal transmitter to said acoustic signal receiver.

The medium determiner may comprise a combined signal transmitter/receiver and reflector or it may comprise a transmitter and receiver located at different locations. In some embodiments the transmitter and receiver are different devices to the main transmitter and receiver whose signals are modified when analysing the structure. In other embodiments the main transmitter or receiver or both may be used to generate and receive the medium determining acoustic signal whose speed is to be detected.

In some embodiments, said device further comprises a data store configured to store modification data for modifying at least one of a phase and amplitude of an acoustic signal and a corresponding indicator of a medium, said signal modifier being configured to select said modification data to apply to at least one of said at least one acoustic signal transmitter and acoustic signal receiver in dependence upon said medium indicator signal.

As noted previously, different modifications are applied to the signal in dependence upon the medium that it is determined the device is within. In some cases the data describing this modification may be stored in a database along with an indication of the corresponding medium such that appropriate modification data can be selected when the medium is detected. Calibration of the device in different media can be used to generate the database. It should be noted that the indication of the medium may simply be an indication of a speed of an acoustic signal through the medium which may be a time delay for travelling the distance that the medium determining acoustic signal travels.

In some embodiments, said stored modification data comprises predetermined distorted waveforms to be transmitted by said acoustic transmitter.

Although, the modification data may be a signal to be applied to a waveform, in some embodiments it comprises a predetermined distorted waveform that the acoustic transmitter is to transmit. This distorted waveform may have a phase and/or amplitude distortions and these distortions have been selected to compensate for perturbations or distortions introduced by the transmitter, receiver and medium within which the device is determined to be.

In some embodiments, said stored modification data comprises predetermined distortions to be applied to the received acoustic signal. An alternative to storing distorted waveforms to be transmitted is to store modifications to be applied to received waveforms. In some embodiments, the database may comprise both a predetermined distorted waveform to be transmitted and a corresponding modification to be applied at the received side.

A second aspect provides a method of analysing at least one structure within a borehole. The method may include determining a medium within said borehole; transmitting and receiving an acoustic signal; wherein at least one of an amplitude and phase of said transmitted acoustic signal are modified in dependence upon said determined medium.

In some embodiments, both of said amplitude and phase of at least one of said transmitted or received acoustic signals are modified in dependence upon said determined medium.

In some embodiments, both said transmitted and received acoustic signals are modified in dependence upon said determined medium.

In some embodiments, said method further comprises in response to determining a change in medium surrounding said device, applying a different signal modification to at least one of said phase and amplitude of said at least one transmitted and optionally said at least one received signal.

In some embodiments, said step of determining said medium comprises determining a speed of an acoustic signal transmitted a predetermined distance through said medium.

In some embodiments, said step of modifying said at least one of an amplitude and phase of at least one of said transmitted or received acoustic signal in dependence upon said determined medium comprises selecting modification data from a data store storing modification data and corresponding medium.

In some embodiments, said stored modification data comprises predetermined distorted waveforms to be transmitted by said acoustic transmitter.

Further particular and preferred aspects are set out in the accompanying independent and dependent claims. Features of the dependent claims may be combined with features of the independent claims as appropriate, and in combinations other than those explicitly set out in the claims.

Where an apparatus feature is described as being operable to provide a function, it will be appreciated that this includes an apparatus feature which provides that function or which is adapted or configured to provide that function.

BRIEF DESCRIPTION OF THE DRAWINGS

Embodiments of the present disclosure will now be described further, with reference to the accompanying drawings, in which.

DETAILED DESCRIPTION

Before discussing the embodiments in any more detail, first an overview will be provided.

Embodiments seek to provide equalisation of the acoustic-electric transmission line, which includes the transmit and receive transducers, electronic circuitry such as power amplifiers and matching tuning components associated with these and also the medium forming the channel between the transmit transducer and the structure to be analysed; and between that structure and the receive transducer. In a device for analysing structures within a borehole the medium between the structure and the transmitter and receiver changes along the length of the borehole and thus, an equalisation technique which involves modification of the transmitted and optionally received signals to compensate for and equalise or at least reduce the distortions introduced by the acoustic-electric transmission line will need to change as the medium changes in order to remain effective. Thus, embodiments provide a determining means for determining properties of the medium, a database that stores modification data relevant for this particular system when within different media, such that applying these modifications will compensate for the hardware of the transmitter/receiver devices and the current medium in the channel, and the modifications will change as changes in the medium are detected.

Figure 1:
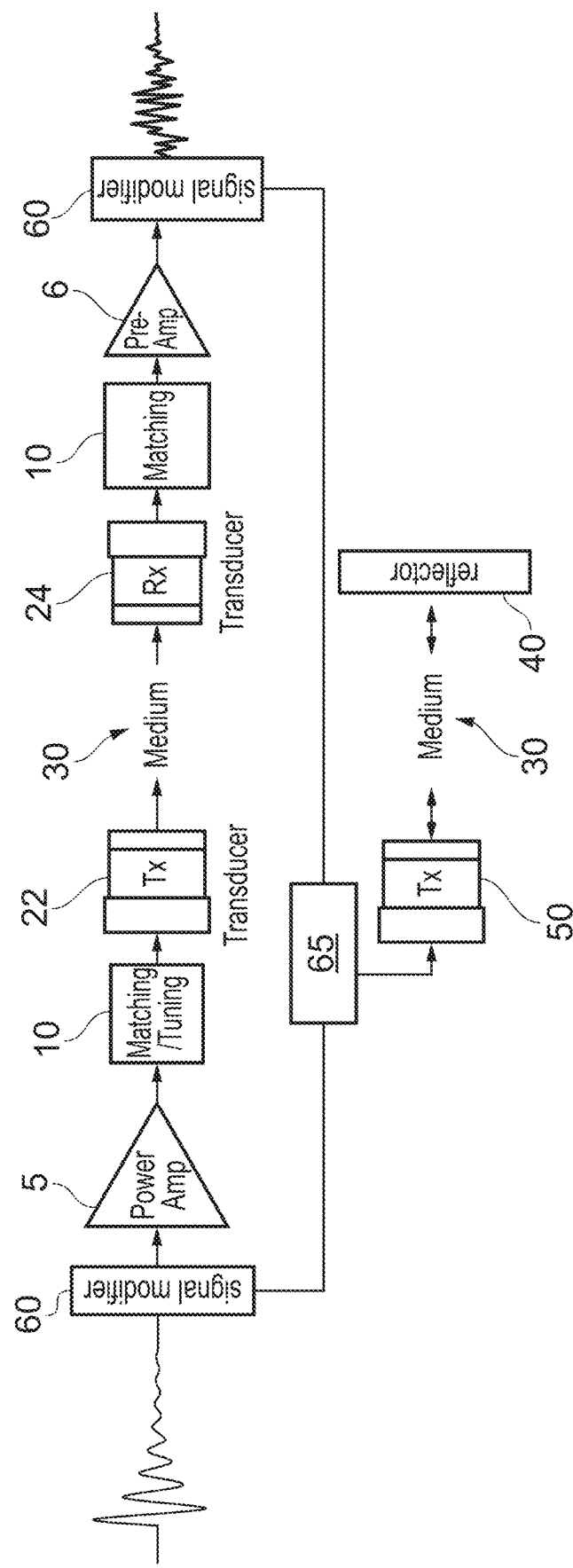
FIG. 1 shows a device for analysing structures within a borehole according to a first embodiment.

FIG. 1 schematically shows a device of an embodiment in the bistatic form where the transmitter and receiver are different devices with the medium 30 containing the structure to be analysed lying between them.

The device comprises a transmitting transducer 22 which produces an acoustic signal for transmission through a medium 30 which contains the structure to be analysed. Receiving transducer 24 receives the signal and outputs the signal to electronics associated with the receiver. In this regard, these electronics may include matching circuitry 10 and a preamplifier 6. The transmitting transducer 22 also has associated hardware in this case a power amplifier 5 and matching/tuning circuitry 10.

Matching/tuning circuitry 10 associated with both the transmitter and the receiver may be hardware circuitry adapted to compensate for known distortions introduced by the transmitter and receiver and to thereby decrease the degradation of the signal. This circuitry is unable however to compensate for distortions generated by the channel that is the medium 30 through which the signal travels to and from the structure as this medium changes along the length of the borehole. In order to compensate for changes in the medium embodiments provide a medium determining circuitry which in this embodiment comprises a monostatic transducer 50 which both transmits and receives acoustic signals and an acoustic reflector 40. An acoustic signal is generated by the transmitter 50 reflected by the reflector 40 and received at the receiver 50. The length of time between transmission and receipt of the signal is indicative of the velocity of the acoustic signal through the medium and from this the type of medium can be determined.

In this embodiment, control circuitry 65 controls medium determining circuitry in the form of monostatic transducer 50 to periodically transmit a signal through medium 30 to reflector 40. The time taken between transmission and receipt of the signals is determined and transmitted to control circuitry 65 and control circuitry 65 determines from a database within control circuitry 65 the medium corresponding to this speed of signal. Control circuitry 65 then sends signals to signal modifiers 60 to modify the signals, in this embodiment both the transmitted and received signals are modified in dependence upon the detected medium 30. Signal modifier 60 is a signal modifier which distorts the signal in a way that compensates for the distortion that it predicts the medium will generate. In the example shown in FIG. 1 an initial signal in the form of a pulse is shown being sent to the transmitter and this pulse is distorted by the hardware and the medium and the distorted signal is shown at the output. Circuitry 60 seeks to compensate for this distortion such that the transmitted signal is pre-distorted prior to transmission and the received signal is also distorted the aim being to generate a signal identical or at least similar to the transmitted one where there is no structure in medium 30. By providing distortions that compensate for the distortions of the channel any distortions in the signal received, that is differences between the received signal and the transmitted signal, will be indicative of the structure within medium 30 and can be used to accurately analyse the structure.

Although in this embodiment the signal and receiver are at either side of the medium in which a target may be located, they may be located on the same side and signals reflected from different interfaces in the target or by an acoustic reflector behind the target may be analysed.

Figure 2:
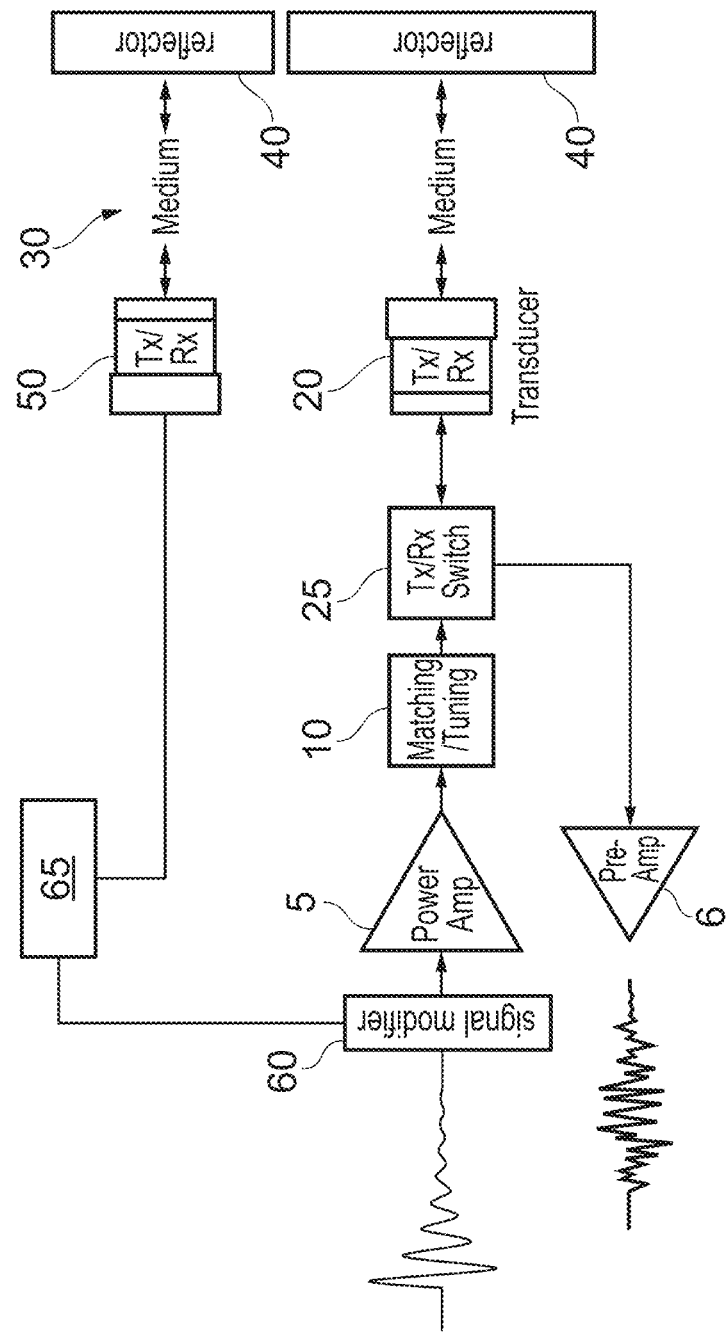
FIG. 2 shows a device for analysing structures within a borehole according to a second embodiment.

FIG. 2 shows an alternative monostatic example where the transducer 20 is both a transmitter and a receiver and the structure is between the transducer 20 and an acoustic reflector 40. In some embodiments there is not a separate acoustic reflector, rather the last acoustic interface that is the back surface of the structure serves as a reflector. There is a switch 25 which controls whether the transducer 20 is transmitting or receiving and which sends the signal to be transmitted to the transducer and sends the received signal to pre-amplifier 6. As in the example of FIG. 1 there is signal modifying circuitry 60. In this example signal modifying circuitry 60 is associated only with the transmitted signal and control circuitry 65 selects a pre-distorted waveform from a data base corresponding to the detected medium and applies this to the signal input to power amplifier 5. This pre-distorted waveform is selected such that distortions due to the hardware of the system and the medium are compensated for and distortions in the received signal can be considered to be caused by the structure being analysed.

Figure 3:
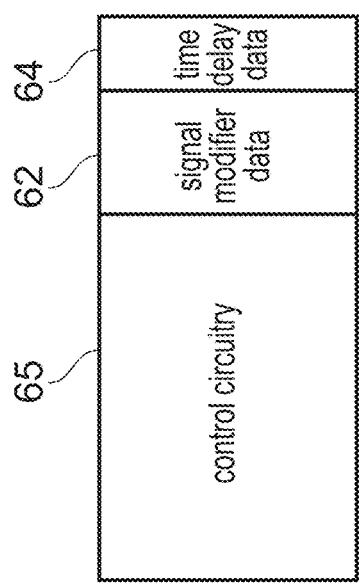
FIG. 3 schematically shows a signal modifier.

FIG. 3 schematically shows control circuitry 65. Control circuitry 65 has a port not shown for receiving signals from the medium detecting device 50 and a port not shown for outputting control signals to the signal modifier 60. Within control circuitry 65 there is a database 62 which stores signal modification data associated with particular medium. In this embodiment there is also a database 64 which stores time delays of an acoustic signal that correspond to a particular medium. In other embodiments, there may just be a signal modification database that stores signal modifications to be applied that correspond to a detected time delay. Thus, control circuitry 65 receives a time delay signal from medium determining circuitry 50 and from this determines a corresponding medium. It then retrieves signal modification data from database 62 relating to that medium. Control circuitry 65 then applies the signal modification data to the system. In this regard, the signal modification data may be a pre-distorted waveform for the transmitter of the signal or it may be a modification to apply to the received signal or it may be a pre-distorted signal to be transmitted and a modification to apply to the received signal.

In this regard, modifications that are applied may comprise phase and/or amplitude modifications that will modify the phase and/or amplitude of the input and/or received signal.

Figure 4:
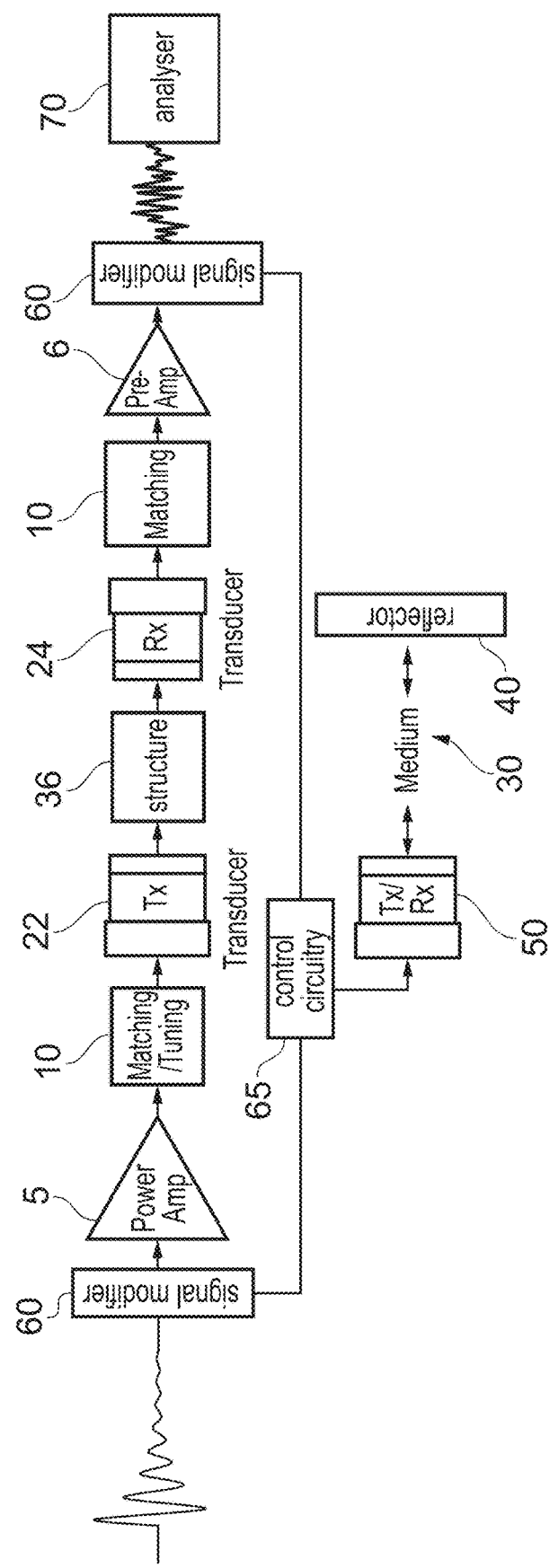
FIG. 4 schematically shows the device of FIG. 1 with the structure to be analysed.

FIG. 4 shows the device of FIG. 1 with the structure 36 to be analysed in place between the transmitter and receiver. The medium determiner 50 transmits a signal through the medium while the transducers 22 and 24 are either side of the structure 36 within the borehole. Signal modifications are applied by circuitry 60 to the transmitted and received signal prior to the received signal being sent to analyser 70 where distortions in the signal are analysed to determine the nature of structure 36.

Figure 5:
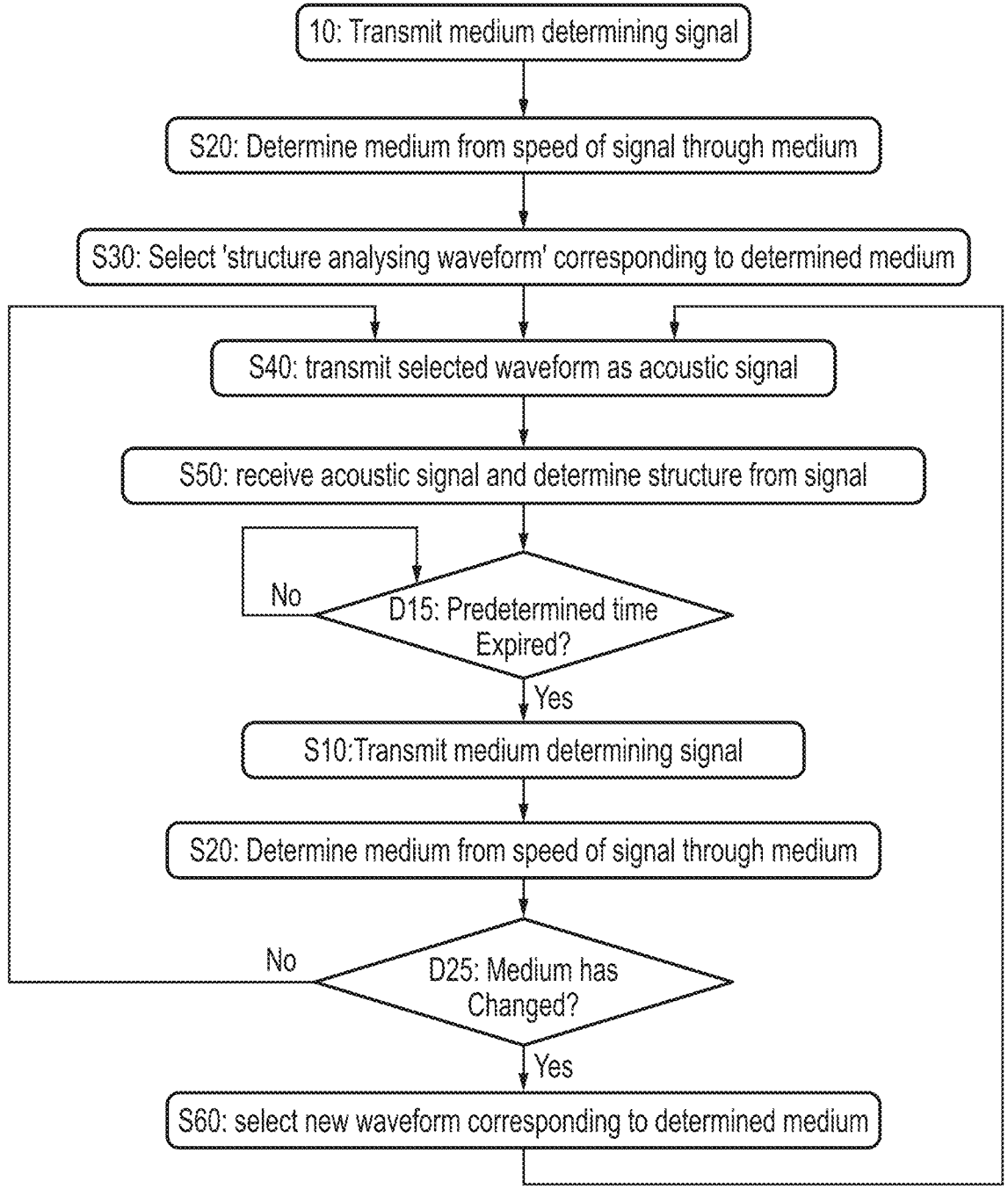
FIG. 5 schematically shows steps in a method of analysing a structure within a borehole according to an embodiment.

FIG. 5 schematically shows a flow diagram illustrating a method of analysing a structure within a borehole according to an embodiment. The structure is analysed along the length of the borehole by passing an analysing device according to an embodiment along the borehole. As the device passes along the borehole, acoustic signals are transmitted and received and the received signals are analysed to determine information regarding the structure within the borehole. This structure may be piping and the piping may have different layers and may have holes or deformities within the structure and suitable analysis of the received waveform will identify things such as the thickness of the structures, deformities within the structures, holes within the structures and changes in coatings and materials.

As the medium surrounding the structure changes along the length of the borehole and this will affect the 'structure analysing signal', the method transmits medium determining signals at step S10, which in this embodiment are in the form of an acoustic signal and determines the speed of the signal through the medium at step S20. The speed is indicative of the medium. Step S20 determines the speed of the signal through the medium from the delay between the transmission of the signal and the receipt of the signal reflected from an acoustic reflector. It should be noted that in other embodiments, the medium may be determined in a different way, such as by measuring the viscosity or density of the medium.

In response to determining the medium the device selects a waveform at step S30 corresponding to the determined medium to apply to the transmitting device. This waveform has been pre-distorted or modified by modifying at least one of the phase and amplitude of the signal to compensate for distortions that the medium and hardware of the system will provoke.

This selected waveform is then continuously transmitted as an acoustic signal at step S40 and continuously received at step S50 as the device travels along the borehole. The received signal is analysed to determine the structure within the borehole.

In this embodiment, the medium determining signal step S10 is performed periodically and thus, when a predetermined time has expired the signal is transmitted again and if it is determined at step D25 that the speed of the signal detected at step S20 has changed from the previously detected speed it is determined that the medium has changed and in response to this a new waveform is selected corresponding to the newly detected medium at step S60. If it is determined that the medium has not changed then the original waveform continues to be transmitted until a change in medium is detected.

In this way, embodiments provided a device that is able to travel through an environment such as a borehole where the medium surrounding the device changes and yet to still accurately analyse structures within the environment by compensating for effects that the changes in medium have on the signal.

A person of skill in the art would readily recognise that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The functions of the various elements shown in the Figures, may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" or "logic" or "control circuitry" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included. Similarly, any switches shown in the Figures are conceptual only. Their function may be carried out through the operation of program logic, through dedicated logic, through the interaction of program control and dedicated logic, or even manually, the particular technique being selectable by the implementer as more specifically understood from the context.

Although illustrative embodiments of the disclosure have been disclosed in detail herein, with reference to the accompanying drawings, it is understood that the disclosure is not limited to the precise embodiment and that various changes and modifications can be effected therein by one skilled in the art without departing from the scope of the disclosure as defined by the appended claims and their equivalents.

The invention claimed is:

1. A device for analyzing structures within a borehole, the device comprising:
   a medium determiner for determining a medium surrounding said device;
   at least one acoustic signal transmitter configured to output a first acoustic signal;
   at least one acoustic receiver configured to receive a second acoustic signal; and
   a signal modifier configured to modify a phase and an amplitude of said first acoustic signal at said at least one acoustic signal transmitter; wherein
   said signal modifier is configured to receive a medium indicator signal from said medium determiner indicative of said medium surrounding said device and to apply a signal modification to said at least one acoustic signal transmitter in dependence upon said medium indicator signal.

2. The device according to claim 1, wherein said signal modifier is configured to modify said first acoustic signal at said acoustic transmitter and said second acoustic signal at said acoustic receiver.

3. The device according to claim 1, said signal modifier being configured in response to said medium indicator signal indicating a change in medium surrounding said device, to apply a different signal modification to said phase and said amplitude of said first acoustic signal.

4. The device according to claim 1, wherein said at least one acoustic signal transmitter and said at least one acoustic signal receiver are a same device.

5. The device according to claim 1, wherein said medium determiner is configured to determine said medium by determining a speed of an acoustic signal transmitted through said medium.

6. The device according to claim 5, wherein said medium determiner comprises an acoustic signal transmitter and receiver and an acoustic signal reflector for reflecting an acoustic signal output by said acoustic signal transmitter of said medium determiner to said acoustic signal receiver of said medium determiner.

7. The device according to claim 1, said device further comprising a data store configured to store modification data for modifying at least one of a phase and an amplitude of an acoustic signal and an indication of a corresponding medium, said signal modifier being configured to select modification data of said stored modification data to apply to at least one of said at least one acoustic signal transmitter and acoustic signal receiver in dependence upon said medium indicator signal.

8. The device according to claim 7, wherein said stored modification data comprises predetermined distorted waveforms to be transmitted by said acoustic transmitter.

9. A method of analyzing at least one structure, the method comprising:
passing a device according to claim 1 along said borehole, determining a medium within said borehole;
transmitting said first acoustic signal and receiving said second acoustic signal; wherein
said amplitude and said phase of said transmitted first acoustic signal are modified in dependence upon said determined medium within said borehole.

10. The method according to claim 9, wherein both said first acoustic signal and said second acoustic signal are modified in dependence upon said determined medium within said borehole.

11. The method according to claim 9, said method further comprising in response to determining a change in medium surrounding said device, applying a different signal modification to said phase and said amplitude of said first acoustic signal being modified.

12. The method according to claim 9, wherein said step of determining said medium within said borehole comprises determining a speed of an acoustic signal transmitted a predetermined distance through said medium within said borehole.

13. The method according to claim 9, wherein modifying said amplitude and said phase of said first acoustic signal in dependence upon said determined medium within said borehole comprises selecting modification data from a data store storing modification data and corresponding indicators of a medium.

14. The method according to claim 13, wherein said stored modification data comprises predetermined distorted waveforms to be transmitted by said acoustic transmitter.

15. A device for analyzing structures within a borehole, the device comprising:
a sensor device configured to determine a medium surrounding the device;
at least one acoustic signal transmitter configured to output a first acoustic signal;
at least one acoustic receiver configured to receive a second acoustic signal; and
a circuit configured to modify a phase and an amplitude of the first acoustic signal at the at least one acoustic signal transmitter;
wherein the circuit is configured to:
receive a medium indicator signal, from the sensor device, indicative of the medium surrounding the device; and
apply a signal modification to the at least one acoustic signal transmitter in dependence upon the medium indicator signal.

* * * * *